United States Patent
Hawkins

(10) Patent No.: US 10,132,105 B1
(45) Date of Patent: Nov. 20, 2018

(54) SECURITY DEVICE FOR SECURING ONE OR MORE CABLES OR CORDS

(71) Applicant: Paul Edward Hawkins, Holland, IL (US)

(72) Inventor: Paul Edward Hawkins, Holland, IL (US)

( * ) Notice: Subject to any disclaimer, the term of this patent is extended or adjusted under 35 U.S.C. 154(b) by 0 days.

(21) Appl. No.: 15/340,403

(22) Filed: Nov. 1, 2016

(51) Int. Cl.
  *F16M 13/00* (2006.01)
  *E05B 73/00* (2006.01)
  *F16L 3/10* (2006.01)
  *F16L 3/223* (2006.01)

(52) U.S. Cl.
  CPC ........ *E05B 73/0005* (2013.01); *F16L 3/1075* (2013.01); *F16L 3/223* (2013.01)

(58) Field of Classification Search
  CPC ..... E05B 73/0023; E05B 73/0005; E06C 7/14
  See application file for complete search history.

(56) References Cited

U.S. PATENT DOCUMENTS

| | | | |
|---|---|---|---|
| 6,218,620 B1 * | 4/2001 | Michel | H02G 15/013 174/92 |
| 7,012,194 B1 * | 3/2006 | Wang | H01R 4/5066 174/138 F |
| 8,369,679 B2 * | 2/2013 | Wakileh | G02B 6/4477 174/78 |

\* cited by examiner

*Primary Examiner* — Amy J. Sterling

(57) ABSTRACT

The invention provides a unique security box secured to a fixed object for securing phone and tablet charging cords as well as electrical cords, thereby preventing theft of said cords. The security box includes a first groove formed in the interior surface parallel to one edge running the length of the lid and a second groove formed in the interior surface near the opposite edge, the two grooves aligned with identical grooves in a bottom portion of the box when the lid is closed. One annular hollow feature is centered within a groove in the bottom portion, a second and third annular hollow features securely positioned in the second groove spaced apart from each other at a distance equal to the length of the first annular hollow feature; the annular features forming an enclosed tube accepting a locking threaded through holding the box securely closed with the locking cable.

5 Claims, 5 Drawing Sheets

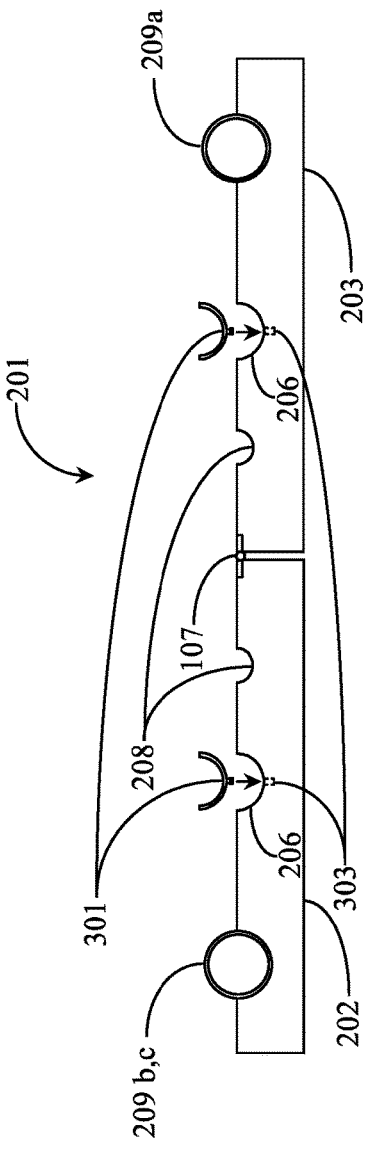
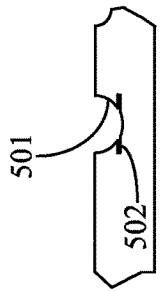
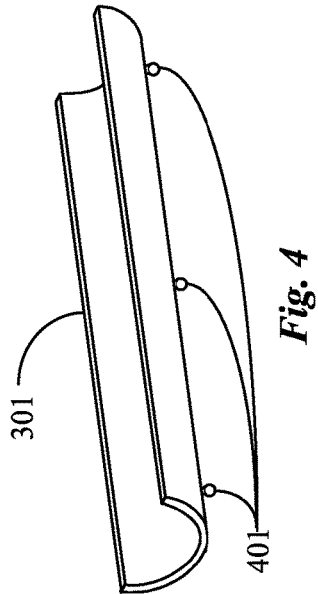
Fig. 3
Fig. 5
Fig. 4
Fig. 6

SECURITY DEVICE FOR SECURING ONE OR MORE CABLES OR CORDS

CROSS-REFERENCE TO RELATED DOCUMENTS

N/A

BACKGROUND OF THE INVENTION

1. Field of the Invention

The present invention is in the field of security and pertains particularly to methods and apparatus for securing utility cords and or cables at a fixed location.

2. Discussion of the State of the Art

In the current state of the art of electronic communications and media consumption, consumers of computing devices, communications devices, and entertainment devices (gaming, etc.) use cords or cable to connect a power source to their devices for charging those devices, which are primarily battery powered and mobile. In addition to AC/DC prong adapted charger cables, there are those used in vehicles to tap the power source through a lighter adapter. There are also accessory cables or cords that carry power to a tool such as a small air compressor used to inflate tires, for example.

It has occurred to the inventor that often such accessory cords or cables used as referenced above become lost or stolen and the user may then be inconvenienced for a period of time until a new cord or cable might be purchased. In some examples of current art electric cords and cables are fixed to a device or tool. The tool and cord are otherwise mobile and may become lost or stolen.

Therefore, what is clearly needed is a security device for securing one or more cables or cords at a fixed location including any cords or cables with devices or tools affixed thereto.

BRIEF SUMMARY OF THE INVENTION

The inventor provides a novel security box for securing electrical cords, comprising at least a lid having a length, a width and a depth, including an interior surface, an exterior surface, a closing edge, and a hinge edge, opposite the closing edge, and a first groove formed in the interior surface parallel to and near the hinge edge running the length of the width of the lid and a second groove formed in the interior surface near the closing edge. A bottom portion is also provided having a second length, width and depth, substantially equal to the length, width and depth of the lid, a second hinge edge and a second closing edge, opposite the second hinge edge, a third groove and a fourth groove. Additionally, a hinge may connect the lid and bottom portion at a common edge.

A first annular hollow feature having a length, diameter may be securely centered within the fourth groove and at least a second and third annular hollow feature having a length and diameter equal to the length and diameter of the first annular hollow feature, the second and third annular hollow features securely positioned in the second groove spaced apart from each other at a distance equal to the length of the first annular hollow feature.

This embodiment also provides that the hinge connects the hinge edge and the second hinge edge and when in the closed position, the first and third groove align enabling a cord to be securely held within, and the first annular hollow feature nestles between the second and third annular hollow features forming an enclosed tube, enabling one end of a locking cable to be threaded through the tube thereby holding the box securely closed with the locking cable.

Another embodiment provides that the locking cable may be a steel (braided) cable coated in a polymer jacket or another strong cable material and a combination or keyed lock on a second end enabling the one end of the cable to be securely locked into the second end.

One embodiment provides that all of the components comprising the security box are manufactured as one integral part from rigid polymer or metal. And the lid and bottom portion may include additional grooves of differing sizes that align when closed enabling securing a plurality of cords of differing sizes.

Cords of differing sizes may be incorporated utilizing sleeves may be inserted into aligned grooves of the top and bottom portion enabling securing cords of differing sizes than the grooves. A method of using the security box is also enclosed laying out steps for positioning the third groove to align with the first groove, and positioning the fourth groove to align with the second groove, placing a cord to be secured in the third groove, thereby securing the cord between the first and third groove when the lid is closed on the bottom portion, forming an enclosed hollow tunnel running the length of the lid and bottom portion, with the lid closed on the bottom portion via a hinge connecting the hinge edge and second hinge edge, forcing the first annular feature between the second and third annular feature, and threading a locking cable through the tunnel thereby locking the lid to the bottom portion.

BRIEF DESCRIPTION OF THE SEVERAL VIEWS OF THE DRAWINGS

FIG. 3 is an elevation view of the security box of FIG. 2 depicting accessory size adapting sleeves according to yet another embodiment of the present invention.

FIG. 4 is a perspective view of a size adapting sleeve according to one embodiment of the present invention.

FIG. 5 is a partial broken view of the groove pattern of FIG. 3 modified according to another embodiment of the present invention.

FIG. 6 is a perspective view of a size adapting sleeve according to another embodiment of the invention.

DETAILED DESCRIPTION OF THE INVENTION

The inventor provides a system for securing valuable charging cords and electrical cords to tools in a manner locking them to a non-mobile fixture. The present invention is described in enabling detail using the following examples, which may describe more than one relevant embodiment falling within the scope of the present invention.

Figure 1:
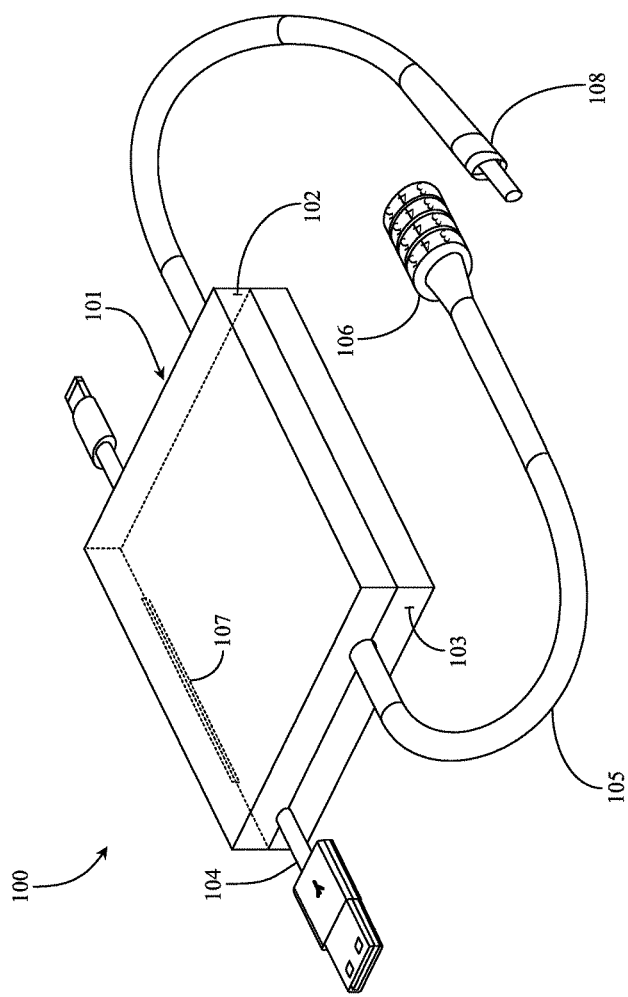
FIG. 1 is a perspective view of a cord/cable security system according to an embodiment of the present invention.

FIG. 1 is a perspective view of a cord/cable security system 100 according to an embodiment of the present invention. System 100 includes a hinged security box 101. Box 101 includes a top side 102 and a bottom side 103. Box sides 102 and 103 are connected at a hinge 107. Box 101 may be a molded product made from a durable polymer material. In another embodiment box 101 may be fabricated of a metal such as stainless steel, which may or may not include plastic molded inserts for each side of the hinged box. Hinge 107 may be fabricated of metal and may be attached to box 101. In one embodiment, hinge 107 may be a contiguous material formed in the molding process (polymer).

In one embodiment, box 101 is mostly solid, that is referring to top side 102 and bottom side 103 accept for certain pockets and grooves referred to as features. In this example, box 101 is closed over a charging cable 104 and a combination locking cable 105 by virtue of grooves formed by mold or otherwise machined into the box top and bottom sides.

Combination locking cable may be a steel (braided) cable coated in a polymer jacket or another strong cable material. Locking cable 105 includes a tumbler style combination lock 106 similar to a briefcase lock and an end 108 that inserts into or is otherwise secured by the lock. Other lock mechanisms might be substituted for tumbler lock 106 without departing from the spirit and scope of the present invention. In this example, combination locking cable 105 prevents box 101 from being opened by virtue of internal annular features installed in the groove path of the cable to enable one end of the cable, in an unlocked position, to pass through all three annular features when the security box is in a closed position. The box may then be closed and the one end inserted into tumbler lock 106 and securely locked. Internal components of box 101 are introduced below.

Figure 2:
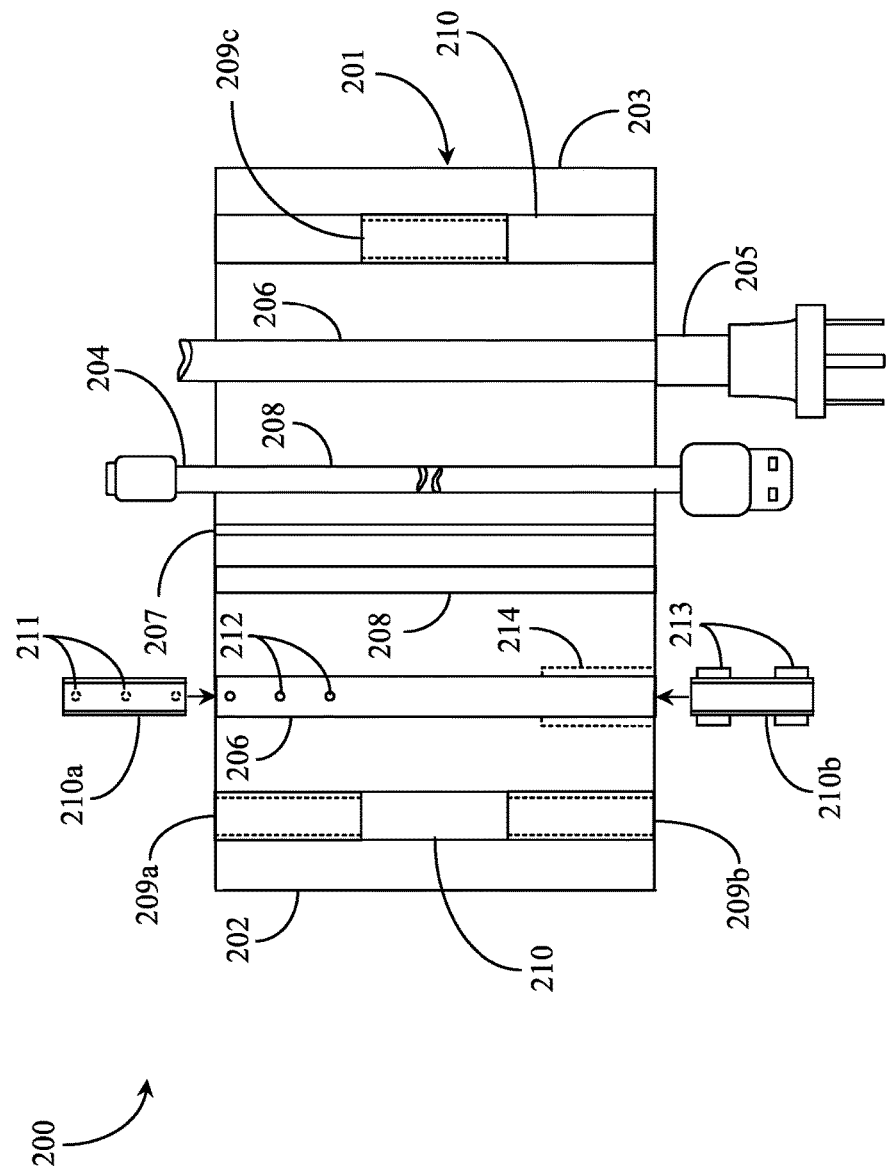
FIG. 2 is an overhead view of an open cord/cable security system according to a variation of the embodiment of FIG. 1.

FIG. 2 is an overhead view of an open cord/cable security system 200 according to a variation of the embodiment of FIG. 1. Security box 201 is very similar in scope to box 101 of FIG. 1 with the exception of an added groove feature 206 one on a top side and one on a bottom side of the security box (two opposing grooves) provided to hold an electric cable 205. Each groove feature provided in box 201 comprises opposing grooves strategically located to align when box 201 is in the closed position. Groove 208 supports charging cord 204. In this example a groove feature 210 is provided to secure the combination locking cable (not shown here) within the box when closed thus preventing the box from opening.

In this example, box 201 includes annular sections 209a, 209b, and 209c, functioning in concert to prevent box 201 from opening once it is closed and the locking cable is threaded through all of the annular sections. When the box is closed components 209a-c align and form a passage or tunnel through which an open end of a locking cable locking cable may be threaded and inserted into the lock, for example, lock 106 of FIG. 1. The locking cable may be secured to a sturdy fixture to prevent someone from taking the box and cords being secured. Sections 209a-c are fixedly attached in the appropriate grooves 210 such as by weld, or by an integral molding process.

In one embodiment, groove features (groove pair) are provided of differing diameters to accommodate known and differing standard diameters of cords and cables. There may be as many groove features as physically allowable for the footprint of the security box without departing from the spirit and scope of the present invention. In this embodiment, as well, accessory size adapting sleeves may be provided to accommodate a cord or cable having a different (smaller) diameter than the groove.

In this example, a size adapting sleeve 210a is provided having an outside diameter similar to the groove and an inside diameter smaller than the groove. Sleeve 210a may be a polymer or metal sleeve without departing from the spirit and scope of the invention. Sleeve 210a may be described as a half-round sleeve (tubular section halved to accept the diameter of the cord or cable. In this case sleeve 210a has snap-in posts 211 molded thereon to enable snapping of the sleeve into position in the groove by virtue of snap post seats 212. A similar sleeve may be positioned on the opposing groove feature as well such that when the box is closed they align and cover the smaller diameter cable that is being secured into the larger groove feature.

In a variation of this embodiment, a size adapting sleeve 210b may be provided that may be slid into a groove such as groove 206 by virtue of a slot feature machined or otherwise formed in groove 214, and by thin tabs 213 molded into the sleeves or otherwise attached to the sleeves by glue or other methods. In either case configuration sleeves 210a and or 210b are strategically implemented onto the groove feature in opposing aligned positions so that when the security box closes, the cord is snugly enclosed inside the sleeves inside the groove 206.

FIG. 3 is an elevation view of the security box 201 of FIG. 2 depicting accessory size adapting sleeves according to an embodiment of the present invention. In this view cords and cables have been removed to further clarify structural features. In this view, locking tube sections 209b, c (c behind b) and 209a are positioned appropriately so that when the box closes a contiguous (enclosed) annular tunnel is formed along the entire width of the security box. Size adapting sleeves 301 may, in one implementation be as long as the security box is wide, otherwise occupying the entire length of groove 206 and may snap or slide into the groove as described further above with reference to sleeves 210a and or 210b of FIG. 2. A cord or cable having a smaller diameter than groove 206 may be enclosed and held more securely than it would without the size adapting sleeves.

FIG. 4 is a perspective view of size adapting sleeve 301 according to one embodiment of the present invention. Sleeve 301 includes snap posts 401. Sleeve 301 is analogous to sleeve 210a of FIG. 2 in function irrespective of length. The sleeve may be any reasonable length and may span the entire length of a groove is snaps into. There may also be more or fewer snap posts 401 implemented on sleeve 301 without departing from the spirit and scope of the invention.

FIG. 5 is a partial broken view of the groove pattern of FIG. 3 modified according to another embodiment of the present invention. In this view, a groove 501 is analogous to groove 206 of FIG. 3 with an exception that there are opposing slots 501 cut into the groove on either side and in the same plane to accommodate a size adapting sleeve with tabs such as sleeve 210b of FIG. 2.

FIG. 6 is a perspective view of a size adapting sleeve 601 according to another embodiment of the invention. Size adapting sleeve 601 is analogous to sleeve 210b of FIG. 2 and has tabs 602, which are analogous to tabs 213 of FIG. 2. The only difference is that sleeve 601 may be the entire length of the groove it is inserted into. Tabs 602 are just thinner that the slots machined or otherwise formed along the groove. In one embodiment only one pair of size adapting sleeves might be required to securely hold a smaller diameter cord in a larger diameter groove feature. In another embodiment, there may be two or more pair of size adapting sleeves without departing from the spirit and scope of the present invention.

Figure 7:
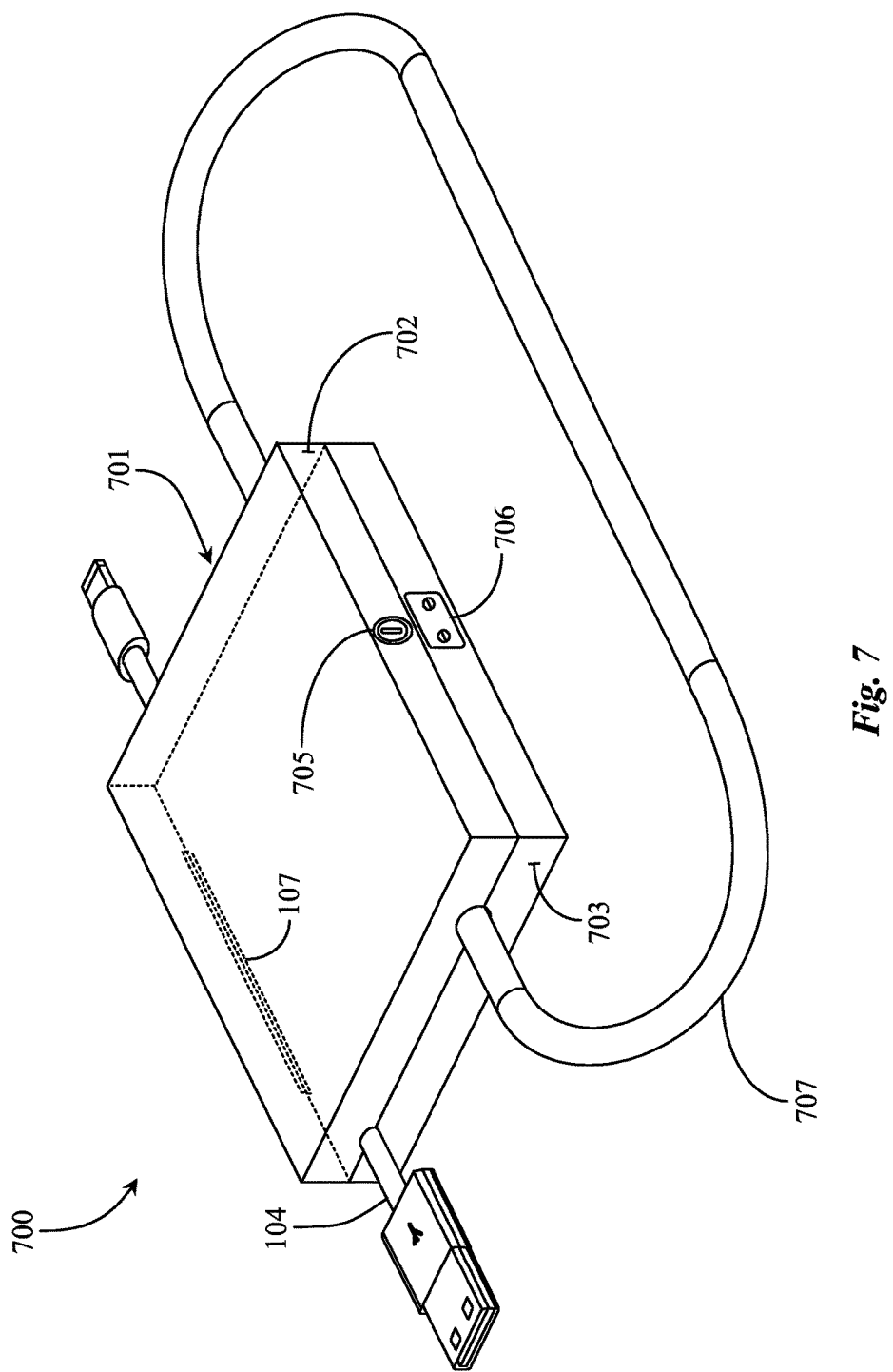
FIG. 7 is a perspective view of a cord/cable security box according to another embodiment of the present invention.

FIG. 7 is a perspective view of a cord/cable security box 700 according to another embodiment of the present invention. In this embodiment, steel cable 707 with no lock on it is used to secure a security box 701 to a fixture. Box 701 may be largely similar to security box 201 of FIG. 2 with an exception that the locking mechanism may be located on the box such as key lock 705 and latch bar mechanism 706 (latch bar not visible). In this example a user may lock the box closed using a privately held key. In still another embodiment, security box 701 may have mounting hardware to mount bottom side 703 to a table or desk as a fixture instead of using a chain or cable to lock it to a fixture. Adhesive may also be used to permanently fix box 701 to a non-mobile surface.

Figure 8:
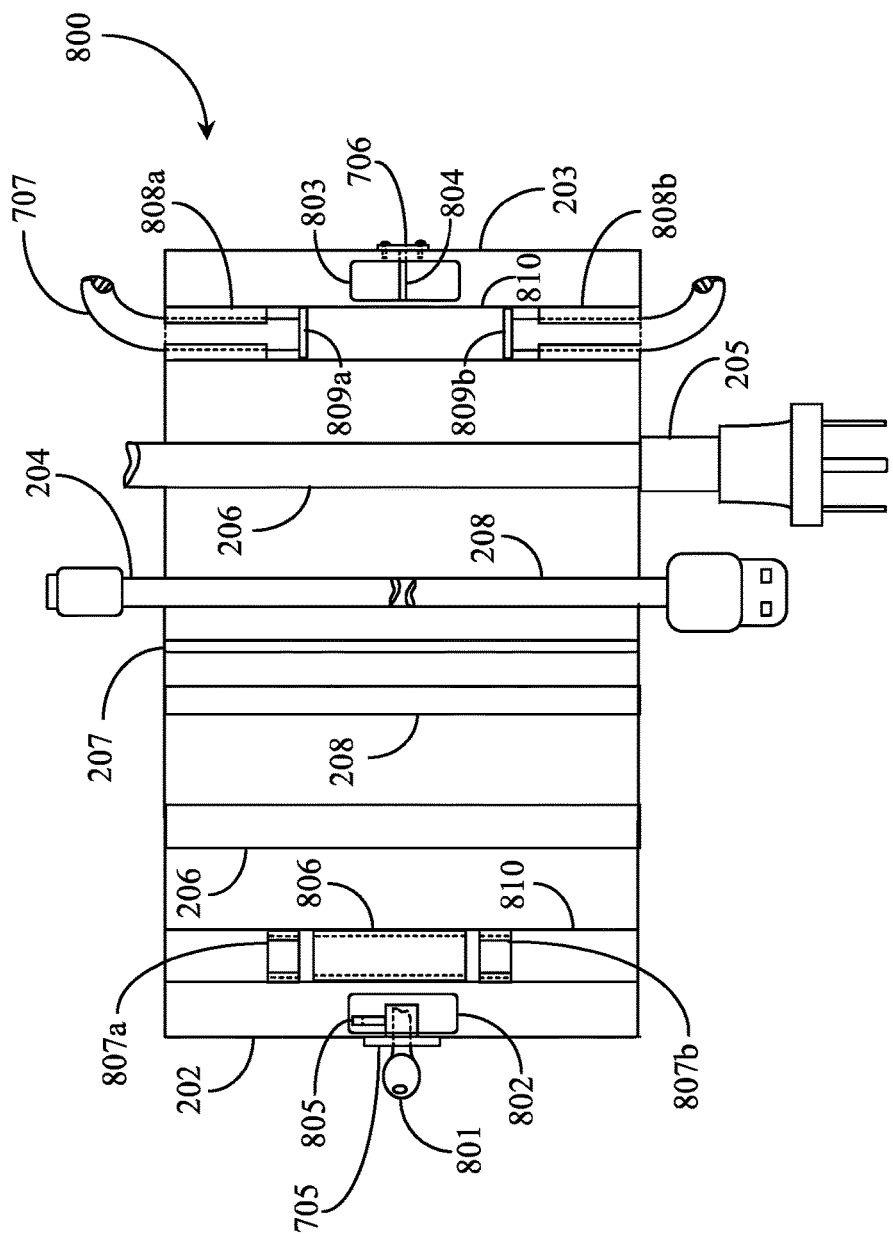
FIG. 8 is an overhead view of a cord/cable security box similar to the security box of FIG. 7 with an added groove for an electric cable.

FIG. 8 is an overhead view of a cord/cable security system 800 similar to the security system of FIG. 7 with an added groove for an electric cable. System 800 includes a security box having many of the same features described further above with respect to FIG. 2 and FIG. 7. Some of the features that are shared and are not modified shall retain the same element numbers in this example. Hinge 207 holds box sides 202 and 203 together. On bottom side 203, a charging cord 204 and electric cord 205 are stationed in respective grooves on the box side to the right of hinge 207 in this view.

In this view more detail can be seen including latch bar mechanism 706 supporting a latch bar 804. A pocket 803 may be provided to house the hardware of lock mechanism 706 via machining or in a molding process. On the opposite side of this view key lock mechanism 705 includes a key latch 805 and a key 801. Pocket 802 is analogous to pocket 803 and represents material removed to house the internal locking components.

In this implementation, cable 707 has opposing end caps 809a and 809b wherein the diameter of those end caps is larger than the diameter of the cable. Two cable stop sleeves 808a and 808b are provided and installed proximal to the ends of a groove 810 for seating the steel cable. Cable stop sleeves 808a and 808b may be welded snapped or otherwise formed onto groove 810 at or near the groove ends and server as cable stops keeping the cable from coming out of the box when the box is locked. Cable stop sleeves 808a and 808b may be cut to remove material on one side leaving material just above the center line to facilitate snap stationing of the cable into the sleeves.

At the opposing side of the security box a spacer tube 806 may be provided to act as a stop preventing the cable ends from encroaching toward the middle part of the groove. Cable retention snap sleeves 807a and 807b are provided spaced off of and adjacent to the central spacer tube and function to secure the cable ends into place in groove 810 effectively spacing the end caps from the edges of the cable stop sleeves. It is noted herein that components 807a and 807b are not required in order to practice the present invention as the cable stops may prevent cable 707 from coming out of the locked box due to being smaller in diameter than the cable end caps.

In this embodiment, a user may insert the cable (707) snapping it through the cable stop sleeves. The user may station the charging cord 204 and electrical cord 205 in their respective grooves. The user may then close the box such that cable retainer sleeves 807a and 807 b capture the cable just behind the retaining components to secure the steel cable against withdraw and sliding back or forth within the groove. Once the box is closed over the cords and cable, a user may lock the box using key 801 and then remove and secure the key such as on a key ring. Components 807a and 807b are fixed components meaning they stay in place by virtue of installation or weld. In one implementation, cable end caps 808a and 808b are positioned within the groove such that they are retained solely by retaining components 807a and 807b when the box is closed. Therefore, cable stop sleeves 808a and 808b are not completely necessary to practice the present invention as retainer snap sleeves 807a and 807b may function independently for that purpose. However, using the combination of components secures cable 707 into a stationary position inside the groove.

In one embodiment, the system of the invention may be used in a public setting such as a library or other location where such cords may be provided by the venue and used by patrons to charge devices of certain types. Personal systems keep cords and cables connected to valuable tools secure such as in a garage, on a bench, on a wall, or other structure the system may be attached to.

It will be apparent to one with skill in the art that the cord/cable security system of the present invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

The invention claimed is:

1. A security box securing electrical cords, comprising:
    a lid having a length, a width and a depth, including an interior surface, an exterior surface, a closing edge, and a hinge edge, opposite the closing edge, and a first groove formed in the interior surface parallel to and near the hinge edge running the length of the width of the lid and a second groove formed in the interior surface near the closing edge;
    a bottom portion having a second length, width and depth substantially equal to the length, width and depth of the lid, a second hinge edge and a second closing edge, opposite the second hinge edge, a third groove and a fourth groove; a hinge;
    a first annular hollow feature having a length, diameter and securely centered within the fourth groove; and
    a second and third annular hollow feature having a length and diameter equal to the length and diameter of the first annular hollow feature, the second and third annular hollow features securely positioned in the second groove spaced apart from each other at a distance equal to the length of the first annular hollow feature;
    wherein, the binge connects the hinge edge and the second hinge edge and when in the closed position, the first and third groove align enabling a cord to be securely held within, and the first annular hollow feature nestles between the second and third annular hollow features forming an enclosed tube, enabling one end of a locking cable to be threaded through the tube thereby holding the box securely closed with the locking cable.

2. The security box of claim 1, wherein the locking cable is a steel braided cable coated in a polymer jacket or another strong cable material and a combination or keyed lock on a second end enabling the one end of the cable to be securely locked into the second end.

3. The security box of claim 1, wherein all of the components comprising the security box are manufactured as one integral, part from rigid polymer or metal.

4. The security box of claim 1, wherein the lid and bottom portion include additional grooves of differing sizes that align when closed enabling securing a plurality of cords of differing sizes.

5. The security box of claim 1, wherein sleeves are inserted into aligned grooves of the top and bottom portion enabling securing cords of differing sizes than the grooves.

* * * * *